(12) United States Patent
Nakamura et al.

(10) Patent No.: US 9,017,206 B2
(45) Date of Patent: Apr. 28, 2015

(54) GEAR DEVICE

(75) Inventors: Koji Nakamura, Tsu (JP); Yasunobu Ogasawara, Tsu (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 14/240,948

(22) PCT Filed: Aug. 20, 2012

(86) PCT No.: PCT/JP2012/005209
§ 371 (c)(1),
(2), (4) Date: Feb. 25, 2014

(87) PCT Pub. No.: WO2013/027385
PCT Pub. Date: Feb. 28, 2013

(65) Prior Publication Data
US 2014/0206497 A1 Jul. 24, 2014

(30) Foreign Application Priority Data
Aug. 25, 2011 (JP) .................................. 2011-183299

(51) Int. Cl.
*F16H 1/32* (2006.01)
*F16H 1/28* (2006.01)

(52) U.S. Cl.
CPC .. *F16H 1/28* (2013.01); *F16H 1/32* (2013.01); *F16H 2001/323* (2013.01)

(58) Field of Classification Search
None
See application file for complete search history.

(56) References Cited

U.S. PATENT DOCUMENTS

2002/0155915 A1   10/2002   Tanaka

FOREIGN PATENT DOCUMENTS

| JP | 38-15612 | 7/1963 |
| JP | 42-17761 | 9/1966 |
| JP | 7-301287 | 11/1995 |
| JP | 2002-317857 | 10/2002 |
| JP | 2007-263253 | 10/2007 |

OTHER PUBLICATIONS

International Search Report of Oct. 29, 2012.

*Primary Examiner* — Erin D Bishop
(74) *Attorney, Agent, or Firm* — Gerald E. Hespos; Michael J. Porco; Matthew T. Hespos (57) ABSTRACT

A gear device includes an outer cylinder, a plurality of crank shafts, a carrier which rotatably supports the plurality of crank shafts and rotates relative to the outer cylinder in synchronization with the rotation of the crank shafts, a plurality of spur gears fixed coaxially with the crank shafts at portions extending toward an outer side of the carrier in the crank shafts, an input gear which includes a gear part that engages with the plurality of spur gears, and transmits rotational drive force to each of the spur gears, and washer means comprising washers disposed outside the carrier. The input gear is regulated from moving in a radial direction of the input gear by engaging with the plurality of spur gears at a position outside the carrier in an axial direction, and regulated from moving in an axial direction of the input gear by the washers.

6 Claims, 11 Drawing Sheets

GEAR DEVICE

TECHNICAL FIELD

The present invention relates to a gear device.

BACKGROUND ART

Conventionally, as a compact and lightweight reduction gear capable of obtaining a large reduction gear ratio, known is an eccentrically oscillating gear device like the type described in Japanese Patent Application Publication No. 2002-317857. With this kind of gear device, the rotational drive force of the motor is transmitted to the crank shaft (in other words, the eccentric body shaft) via a cylindrical input gear (in other words, an intermediate gear) and a spur gear (in other words, a transmission gear) which engages therewith, and the crank shaft is thereby rotated. The input gear is rotatably supported by the carrier of the reduction gear and the motor flange, respectively, via a bearing.

However, with the gear device configured as described above, since a bearing for supporting the input gear is required, the production cost will increase, and space for placing the bearing inside the carrier is also required.

Thus, as with the gear device described in Japanese Patent Application Publication No. 2007-263253, also proposed is a configuration in which the input gear (in other words, the distribution gear) is not supported by a bearing. In other words, this gear device is configured to define the position of the input gear in the radial direction as well as define the position of the input gear in the axial direction. Specifically, the position of the input gear in the radial direction is defined by a plurality of (for instance, three or more) spur gear (in other words, the eccentric body shaft gear) disposed around the input gear engaging with that input gear, and the position of the input gear in the axial direction is defined as a result of the input gear being disposed between the two external gears inside the carrier. With this kind of configuration, a bearing for supporting the input gear is no longer required.

However, with the gear device described in Japanese Patent Application Publication No. 2007-263253, since the structure for regulating the movement of the input gear in the axial direction requires the input gear to be disposed inside the carrier of the gear device and the input gear to be disposed between two external gears, the structure becomes complicated.

Furthermore, with this kind of gear device, upon replacing the input gear in order to change the reduction gear ratio or the like, work for disassembling the carrier, in which the mechanical portions of the gear device are concentrated, and replacing the input gear inside the carrier is required. Thus, a complicated work process will arise, and there is a possibility that the production cost, maintenance cost and the like may increase.

SUMMARY OF THE INVENTION

An object of the present invention is to provide a gear device capable of regulating the input gear from moving in its axial direction with a simple structure, and in which the input gear can be easily replaced.

The gear device of the present invention is a gear device for transmitting torque, at a predetermined reduction gear ratio, between a pair of partner members, including: an outer cylinder which can be fixed to one of the pair of partner members; a plurality of crank shafts; a carrier which can be fixed to the other one of the pair of partner members and rotatably housed inside the outer cylinder, and rotatably supports the plurality of crank shafts, and moreover rotates relative to the outer cylinder in synchronization with the rotation of the plurality of crank shafts; a plurality of spur gears which are fixed coaxially with the crank shafts at portions extending toward an outer side of the carrier in the crank shafts; an input gear which includes a gear part that engages with the plurality of spur gears, and transmits rotational drive force to each of the plurality of spur gears; and washer means comprising a plurality of washers disposed outside the carrier, wherein the input gear is regulated from moving in a radial direction of the input gear by engaging with the plurality of spur gears at a position outside the carrier in an axial direction, and regulated from moving in an axial direction of the input gear by the washer means.

BEST MODE FOR CARRYING OUT THE INVENTION

Modes for implementing the present invention are now explained in detail with reference to the drawings.

The gear device according to this embodiment is a gear device that is applied as a reduction gear to a revolving superstructure such as a revolving body or a wrist joint of a robot or a revolving superstructure of various machine tools. In the ensuing explanation of this embodiment, described is an example of applying the gear device to a revolving superstructure such as an arm of a robot.

First Embodiment

Figure 1:
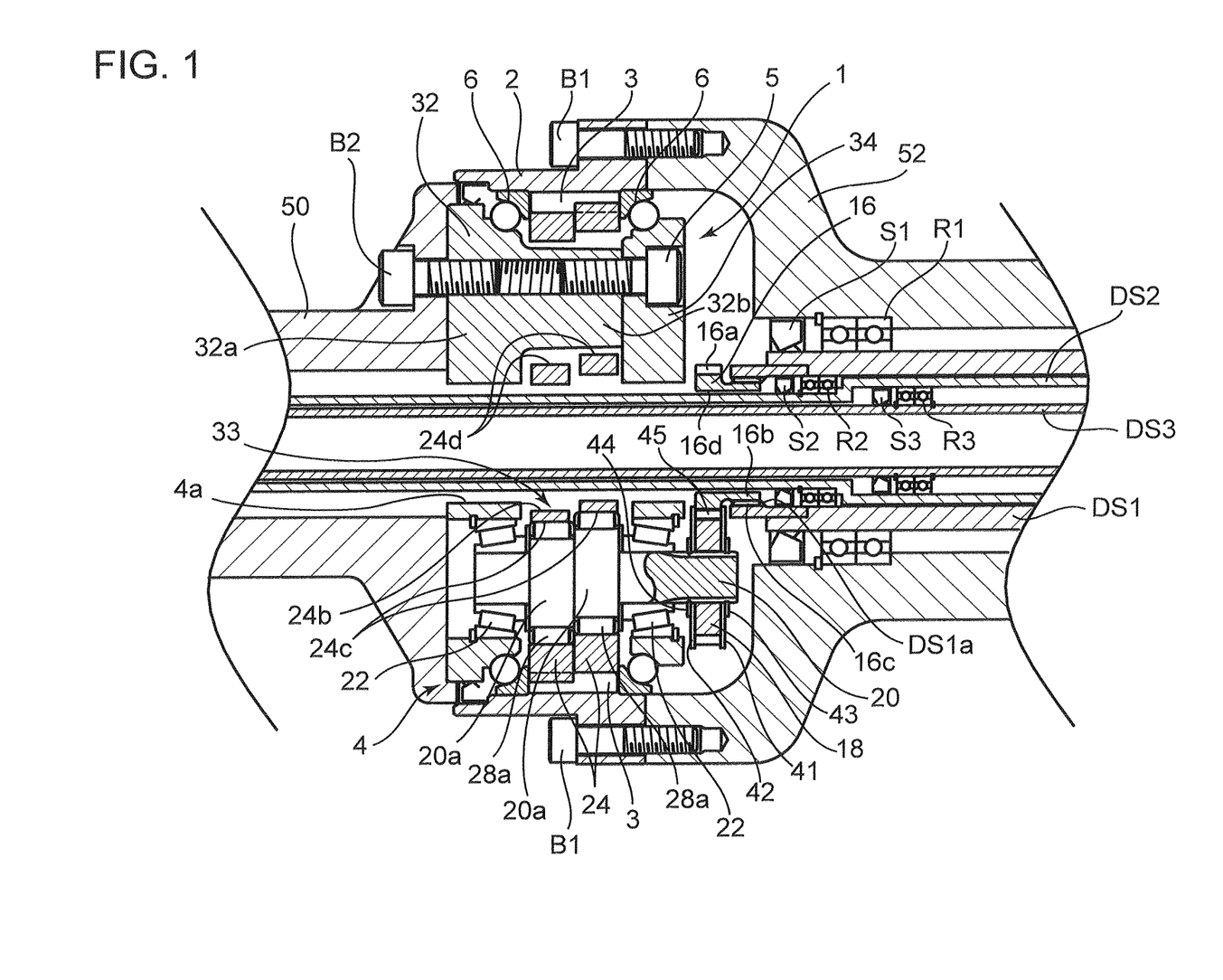
FIG. 1 is a cross section showing a state where the gear device according to the first embodiment of the present invention is applied to a portion of the shoulder joint of a robot.

The gear device 1 according to the first embodiment is a device which transmits torque, at a predetermined reduction gear ratio, between a revolving superstructure 50 and a base 52 at a portion of the shoulder joint of a robot as shown in FIG. 1. The gear device 1 relatively and rotatably drives the revolving superstructure 50 relative to the base 52 by decelerating the rotational drive force of the motor that was transmitted via a cylindrical first drive shaft DS1. Moreover, in this embodiment, a second drive shaft DS2 and a third drive shaft DS3 for rotatably driving a portion (for instance, a portion such as a hand or an arm) that is farther down than the shoulder joint of the robot are disposed coaxially with the first drive shaft DS1 and the carrier 4 inside the first drive shaft DS1, and penetrate the center portion of the gear device 1.

The gear device 1 of this embodiment comprises, as shown in FIGS. 1 to 4, an outer cylinder 2, an internal gear pin 3, a carrier 4, a main bearing 6, a plurality of crank shafts 20, crank bearings 22, oscillating gears 24, an input gear 16, a plurality of spur gears 18 each fixed to the plurality of crank shafts 20, and a washer means comprising washers 41, 42 provided to either side of the respective spur gears 18. The mechanical portion (that is, the portion that is the inner side from the outer cylinder 2) of the gear device 1 is isolated in a space, which is blocked from the outside, formed as a result of the revolving superstructure 50, the base 52 and the outer cylinder 2 being combined, and lubricating oil is sealed inside that space.

Figure 2:
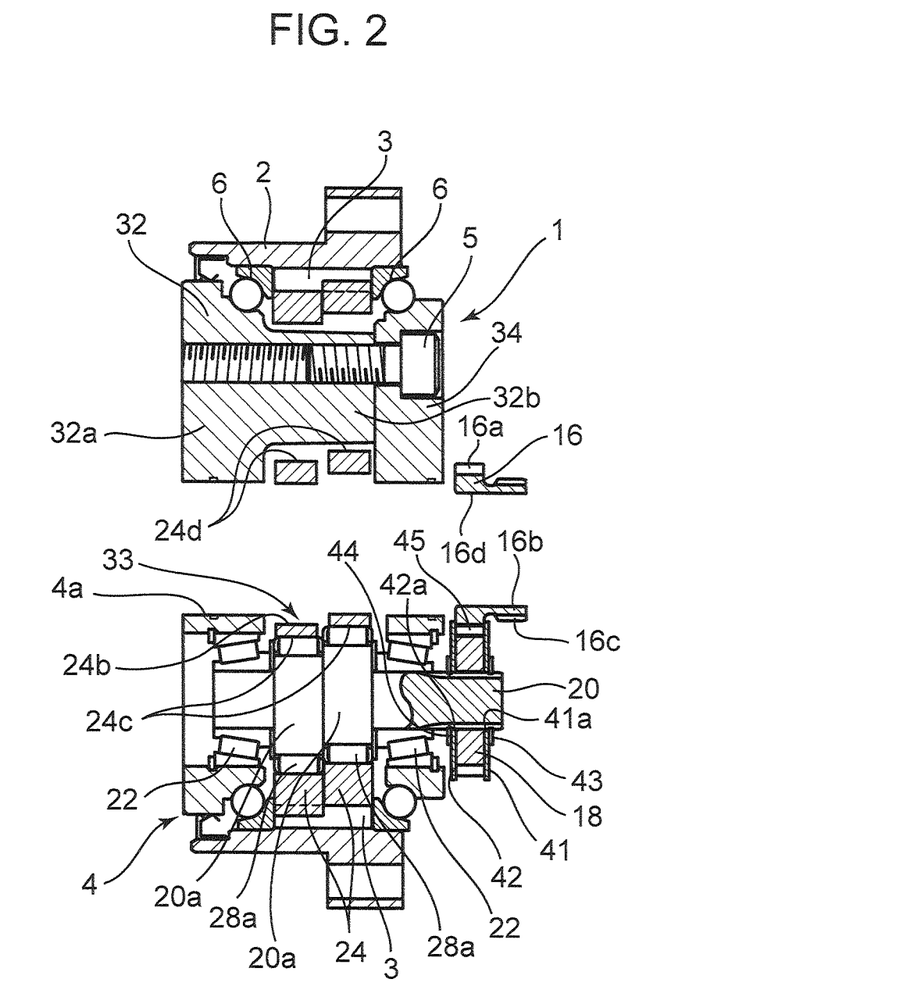
FIG. 2 is a cross section of the gear device shown in FIG. 1.

The outer cylinder 2 is formed in a shape that can be fixed to one of the partner members (the base 52 in this embodiment), and functions as a case of the gear device 1. The outer cylinder 2 is formed in a substantial cylindrical shape. The outer cylinder 2 is fastened, for example, to the base 52 of the robot via a bolt B1. Multiple internal gear pins 3 are disposed at regular intervals in a peripheral direction on the inner face of the outer cylinder 2. The internal gear pins 3 function as internal teeth with which is engaged the oscillating gear 24 that comprises an external gear. The number of teeth of the oscillating gear 24 is slightly fewer than the number of internal gear pins 3. In this embodiment, two (multiple) oscillating gears 24 are used.

The carrier 4 is formed in a shape that can be fixed to another of the partner members (the revolving superstructure 50 in this embodiment), and is, for example, fastened to the revolving superstructure 50 of the robot, relatively rotatable relative to the outer cylinder 2, and housed in the outer cylinder 2 in a state of being disposed coaxially with the outer cylinder 2. In this embodiment, the carrier 4 relatively rotates around the same axis relative to the outer cylinder 2. The carrier 4 is fastened to the revolving superstructure 50 via a plurality of bolts B2. When the carrier 4 relatively rotates relative to the outer cylinder 2, the revolving superstructure 50 gyrates about the base 52.

Note that, while the carrier 4 is fastened to the revolving superstructure 50 and can gyrate in this embodiment, the outer cylinder 2 is fixed to the base 52 and is immovable. However, it goes without saying that the gear device 1 can also be used in a state where the outer cylinder 2 is fastened to the revolving superstructure 50, and the carrier 4 is fastened to the base 52.

The carrier 4 is supported by a pair of main bearings 6 provided separately in the axial direction, in a manner of being relatively rotatable relative to the outer cylinder 2. In addition, the carrier 4 comprises a base part 32 and an end plate part 34, and a housing space 33 for housing the oscillating gear 24, which is a transmission member which transmits the torque that is generated between the outer cylinder 2 and the carrier 4, is formed therebetween.

The base part 32 includes a substrate part 32a which is disposed near the end of the outer cylinder 2 within the outer cylinder 2, and a plurality of shaft parts 32b that extend in the axial direction from the substrate part 32a toward the end plate part 34. The shaft part 32b is fastened to the end plate part 34 via a bolt 5. Consequently, the base part 32 and the end plate part 34 are integrated. Moreover, a center part of the carrier 4 in the radial direction is provided with a through-hole 4a which penetrates the carrier 4 in the axial direction. The housing space 33 is in communication with the outside of the carrier 4 through the through-hole 4a. Through this through-hole 4a, the foregoing second drive shaft DS2 and third drive shaft DS3 penetrate the center of the carrier 4.

A plurality of (in this embodiment, three) crank shafts 20 are provided, and each crank shaft 20 is disposed every 120 degrees at regular intervals in the peripheral direction around the through-hole 4a and the input gear 16 in the carrier 4. Each crank shaft 20 is rotatably supported by the carrier 4 via a pair of crank bearings 22.

The crank shaft 20 includes a plurality of (in this embodiment, two) eccentric parts 20a. The plurality of eccentric parts 20a are disposed in line in the axial direction at a position between the pair of crank bearings 22. Each eccentric part 20a is formed in a cylindrical shape that is decentered at a predetermined eccentricity from the shaft center of each crank shaft 20. In addition, each eccentric part 20a is formed on the crank shaft 20 so as to mutually have a phase difference of a predetermined angle.

Two oscillating gears 24 are each mounted, via a roller bearing 28a, on each eccentric part 20a of the crank shaft 20. The oscillating gear 24 is formed slightly smaller than the internal diameter of the outer cylinder 2, and oscillates and rotates while engaging with the internal gear pins 3 on the inner face of the outer cylinder 2 in conjunction with the eccentric rotation of the eccentric part 20a when the crank shaft 20 rotates.

The oscillating gear 24 includes a center part through-hole 24b, a plurality of eccentric part insertion holes 24c, and a plurality of shaft parts insertion holes 24d.

The eccentric part insertion holes 24c are provided at regular intervals in the peripheral direction around the center part through-hole 24b in the oscillating gear 24. The eccentric part 20a of the respective crank shafts 20 is inserted through each eccentric part insertion hole 24c in a state where the roller bearing 28a is interposed therebetween.

The shaft part insertion holes 24d are provided at regular intervals in a peripheral direction around the center part through-hole 24b in the oscillating gear 24. Each shaft part insertion hole 24d is disposed at a position that is between the eccentric part insertion holes 24c in the peripheral direction. Each shaft part 32b of the carrier 4 is inserted through each shaft part insertion hole 24d with a backlash.

The end of each crank shaft 20 is protruding outward from the carrier 4 along the axial direction of the carrier 4. The spur gear 18 is removably mounted via snap rings 43, 44, in a state of being sandwiched by a pair of washers 41 and 42, on the end extending to the outside of the carrier 4 in the crank shaft 20.

As shown in FIG. 2, the snap rings 43, 44 regulate the spur gear 18 and the pair of washers 41, 42 from moving in the axial direction of the crank shaft 20 by fitting into a groove that is formed on the outer peripheral face at the end of the crank shaft 20. The snap rings 43, 44 comprise a C-shaped metal ring or the like.

Each spur gear 18 is engaged with the gear part 16a of the input gear 16 described later. Each spur gear 18 transmits the rotation of the input gear 16 to the crank shaft 20 on which the spur gear 18 is mounted.

The input gear 16 is a gear that engages with the plurality of spur gears 18, and transmits the rotational drive force to each of the plurality of spur gears 18. The input gear 16 comprises a gear part 16a comprising an external gear that engages with the plurality of spur gears 18, and a connecting part 16b that is integrally formed with the gear part 16a concentrically in line with the gear part 16a. A spline groove 16c is formed on the outer peripheral face of the connecting part 16b. The spline groove 16c is formed in a shape capable of fitting with the first drive shaft DS1, which transmits the rotational drive force of the motor, while being regulated so that it does not move in the radial direction. Specifically, the spline grooves 16c mutually extend in parallel along the axial direction of the input gear 16, and are formed at regular intervals on the outer peripheral face of the cylindrical connecting part 16b.

When the connecting part 16b is inserted inside the cylindrical first drive shaft DS1, the spline groove 16c on the outer peripheral side of the connecting part 16b can engage with a spline salient DS1a on the inner peripheral side of the first drive shaft DS1. Consequently, the input gear 16 can be easily coupled to the first drive shaft DS1.

Provided at the center of the input gear 16 is a through-hole 16d that penetrates the input gear 16 in the axial direction. A second drive shaft DS2 and a third drive shaft DS3 are inserted through the through-hole 16d.

The washers 41, 42 are each thin metal disks respectively including through-holes 41a, 42a, and disposed by being separated on either side of the spur gear 18 in the axial direction of the spur gear 18. A slight backlash is provided between the washers 41, 42 and the input gear 16 that is sandwiched therebetween. The external diameter of the washers 41, 42 is slightly larger than the external diameter of the spur gear 18, and is set to be at least a size capable of hiding the engaging portion 45 of the spur gear 18 and the input gear 16.

Figure 3:
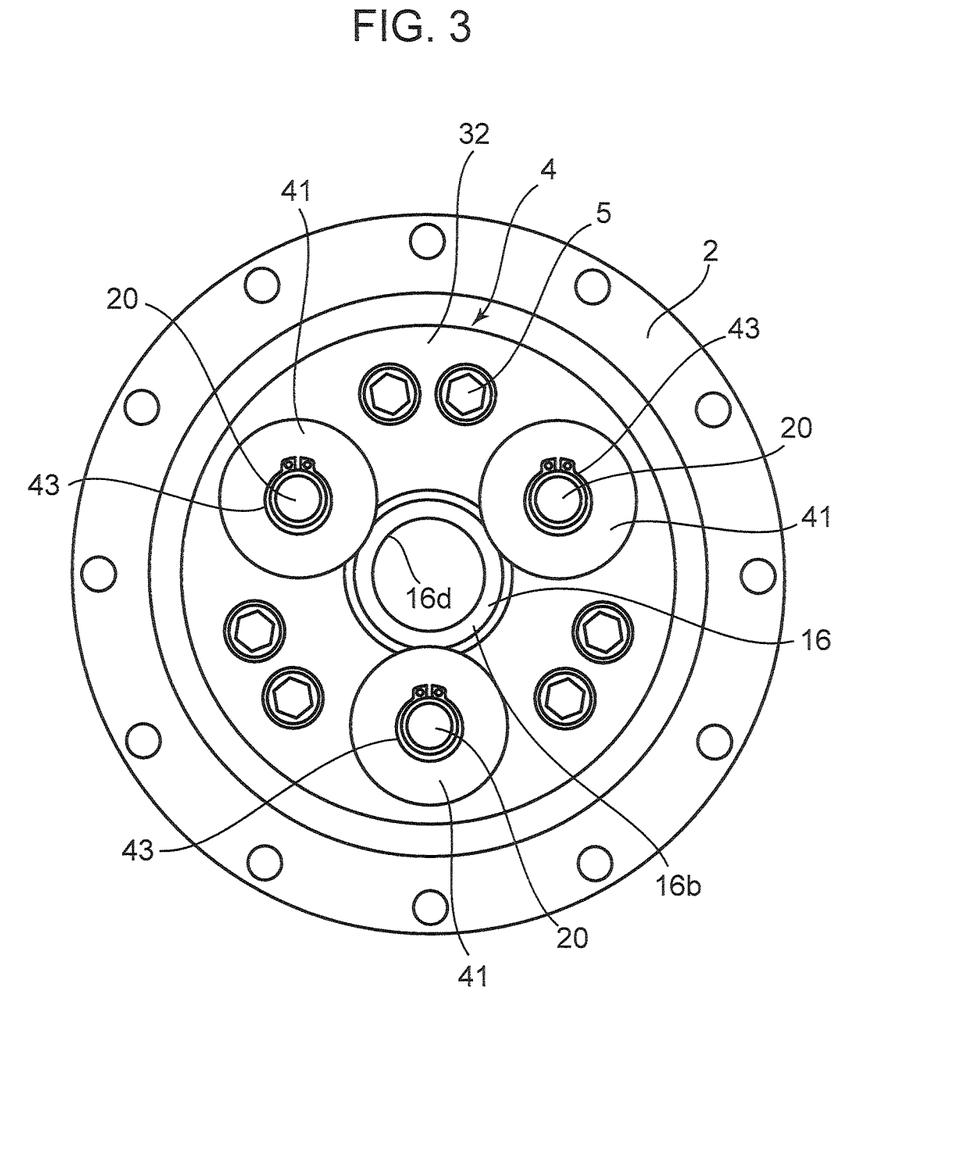
FIG. 3 is a right side view of the gear device shown in FIG. 1.
Figure 4:
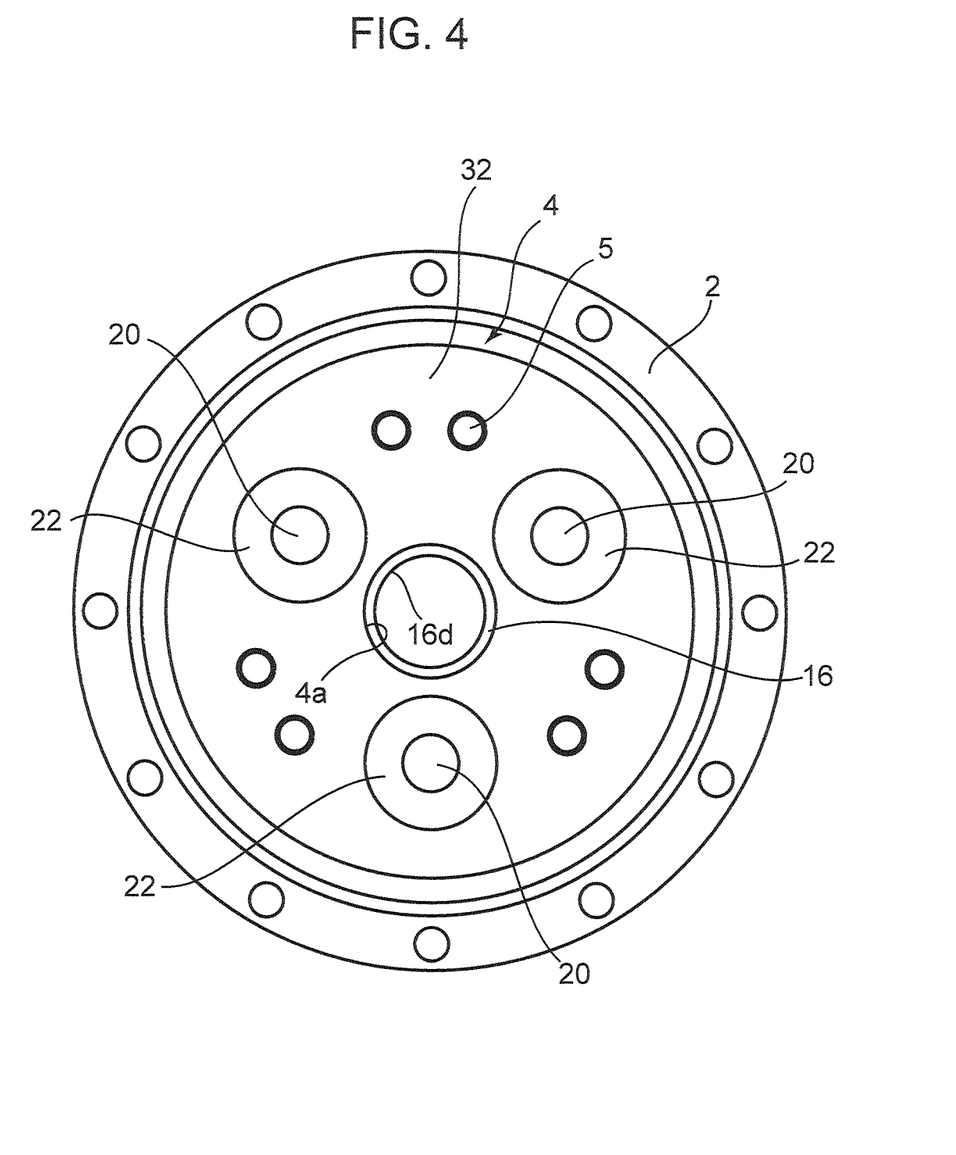
FIG. 4 is a left side view of the gear device shown in FIG. 1.

The respective washers 41, 42 are provided individually to each of the plurality of spur gears 18. The respective washers 41, 42 sandwich the portion including a part of the gear part 16a of the input gear 16; specifically, the engaging portion 45 of the spur gear 18 and the input gear 16 and the peripheral portion thereof, from either side of the spur gear 18 along the axial direction of the spur gear 18.

In the foregoing configuration, at a position on the outside of the carrier 4 in the axial direction of the carrier 4, the input gear 16 is regulated from moving in the radial direction by the gear part 16a of the input gear 16 engaging with a plurality of (in this embodiment, three) spur gears 18 disposed at regular intervals in the peripheral direction.

In addition, as a result of the washers 41, 42 that are independently provided to each of the plurality of spur gears 18 sandwiching the gear part 16a of the input gear 16 (specifically, the engaging portion 45 of the spur gear 18 and the input gear 16 and the peripheral portion thereof) from either side of the spur gear 18 along the axial direction of the spur gear 18, the input gear 16 is regulated from moving in the axial direction by the washers 41, 42.

As shown in FIG. 1, the first drive shaft DS1 is rotatably supported inside the base 52 via a bearing R1. Moreover, a seal ring S1 is provided between the outer peripheral face of the first drive shaft DS1 and the inner peripheral face of the base 52 so that the lubricating oil within the base 52 and the gear device 1 does not leak to the outside.

Moreover, the second drive shaft DS2 is rotatably supported inside the first drive shaft DS1 via a bearing R2, and a seal ring S2 seals the space between the first drive shaft DS1 and the second drive shaft DS1. Similarly, the third drive shaft DS3 is rotatably supported inside the second drive shaft DS2 via a bearing R3, and a seal ring S3 seals the space between the second drive shaft DS2 and the third drive shaft DS3.

The operation of the gear device 1 according to this embodiment is now explained.

When the input gear 16 receives the rotational drive force from the motor via the first drive shaft DS1, that rotational drive force is transmitted to each of the spur gears 18 via the gear part 16a of the input gear 16. Consequently, each crank shaft 20 rotates about its axis.

In addition, pursuant to the rotation of the respective crank shafts 20, the eccentric part 20a of that crank shaft 20 rotates eccentrically. Consequently, the oscillating gear 24 oscillates and rotates while engaging with the internal gear pins 3 on the inner face of the outer cylinder 2 in conjunction with the eccentric rotation of the eccentric part 20a. The oscillating rotation of the oscillating gear 24 is transmitted to the carrier 4 via the respective crank shafts 20. In this embodiment, since the outer cylinder 2 is fixed to the base 52 and immovable, the carrier 4 and the revolving superstructure 50 can rotate relative to the outer cylinder 2 and the base 52 at a rotating speed which was decelerated from the input rotation.

Features of First Embodiment (1) With the gear device 11 according to the first embodiment of the present invention, since the input gear 16 is regulated from moving in the radial direction as a result of engaging with the plurality of spur gears 18 at a position that is outside of the carrier 4, in the axial direction, of the gear device 1, and regulated from moving in the axial direction by the washer means comprising the washers 41, 42 disposed outside the carrier 4, it is possible to regulate the input gear 16 from moving in the axial direction with a simple structure. Moreover, by removing the respective washers 41, 42 disposed outside the carrier 4, the input gear 16 can be easily replaced by releasing the regulation of the input gear 16 in the axial direction, and the reduction gear ratio can be changed easily.

(2) Moreover, with the gear device 11 according to the first embodiment, since the washers 41, 42 are disposed by being separated on either side of the spur gear 18 in the axial direction, it is possible to sandwich the input gear 16 with the washers 41, 42, and regulate the movement of the input gear 16 in the axial direction. Consequently, it is possible to regulate the movement of the input gear 16 in the axial direction with a simple configuration. Furthermore, the washers 41, 42 can be easily removed together with the spur gear 18, and the disassembly and assembly are facilitated.

(3) In addition, with the gear device 11 according to the first embodiment, the plurality of washers 41, 42 are provided independently to each of the plurality of spur gears 18, the respective washers 41, 42 sandwich the portion including a part of the gear part 16a of the input gear 16 from either side of the spur gear 18 along the axial direction of the spur gear 18. It is thereby possible to reliably regulate the movement of the input gear 16 in the axial direction. Accordingly, movement of the input gear 16 in the axial direction can be regulated with a simple configuration. Furthermore, the washers 41, 42 can be easily removed together with the spur gear 18, and the disassembly and assembly are facilitated. In particular, since the respective washers 41, 42 can be attached to and detached from the crank shaft 20 together with the spur gear 18, the disassembly and assembly work is facilitated, and increase in the work process can be inhibited.

Furthermore, since the washers 41, 42 are individually provided to each of the plurality of spur gears 18, the washers 41, 42 can also be directly applied to the gear device 1 in which the placement of the crank shaft 20 and the size of the carrier 4 are different, and the versatility is high.

(4) In the first embodiment, the input gear 16 includes a gear part 16a, and a connecting part 16b including a spline groove 16c which is disposed concentrically in line with the gear part 16a and extends along the axial direction of the input gear 16, and the spline groove 16c is formed in a shape capable of fitting into the first drive shaft DS1, which transmits the rotational drive force of the motor, while being regulated so that it does not move in the radial direction. Based on this configuration, since the spline groove 16c formed on the connecting part 16b of the input gear 16 can be fitted into the shaft, which transmits the rotational drive force of the motor, while being regulated so that it does not move in the axial direction of the input gear 16, drive from the motor can be easily transmitted to the gear device 1, and the input gear 16 can be easily mounted on the shaft.

Modified Example of First Embodiment

Note that, with the gear device 1 of the first embodiment, while a hollow-shaped input gear 16 with a through-hole 16d formed therein is used, the present invention is not limited to the foregoing configuration, and the input gear 16 may also be solid.

Second Embodiment

Figure 5:
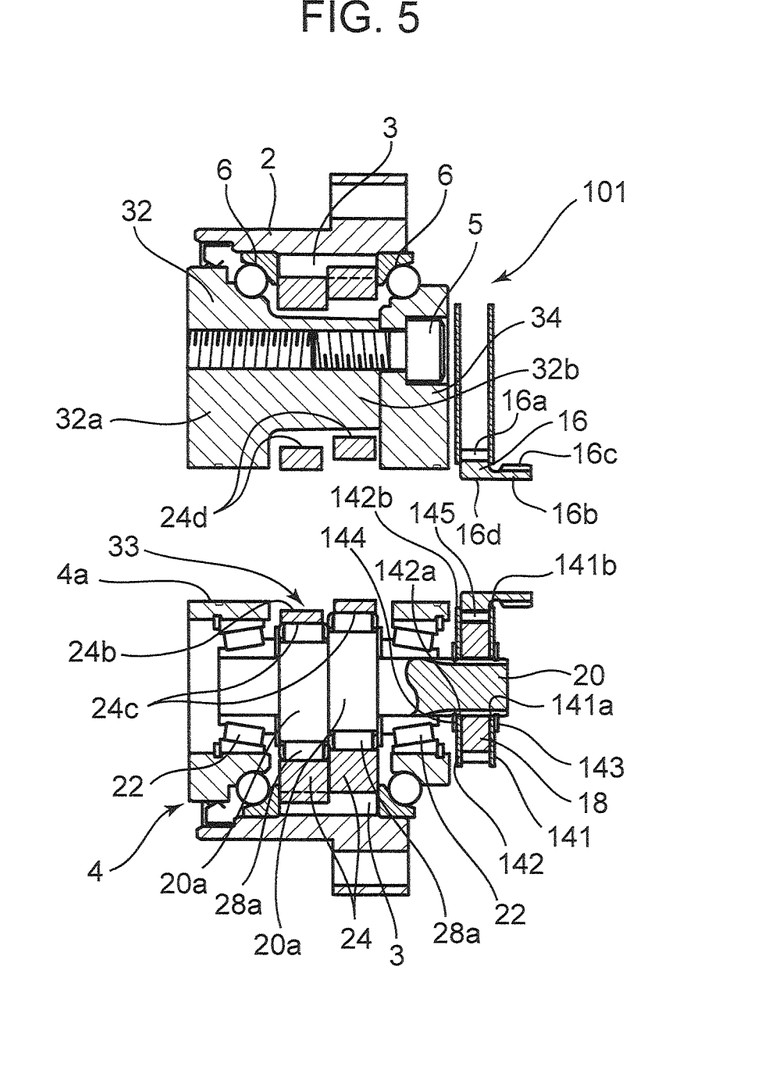
FIG. 5 is a cross section of the gear device according to the second embodiment of the present invention.
Figure 6:
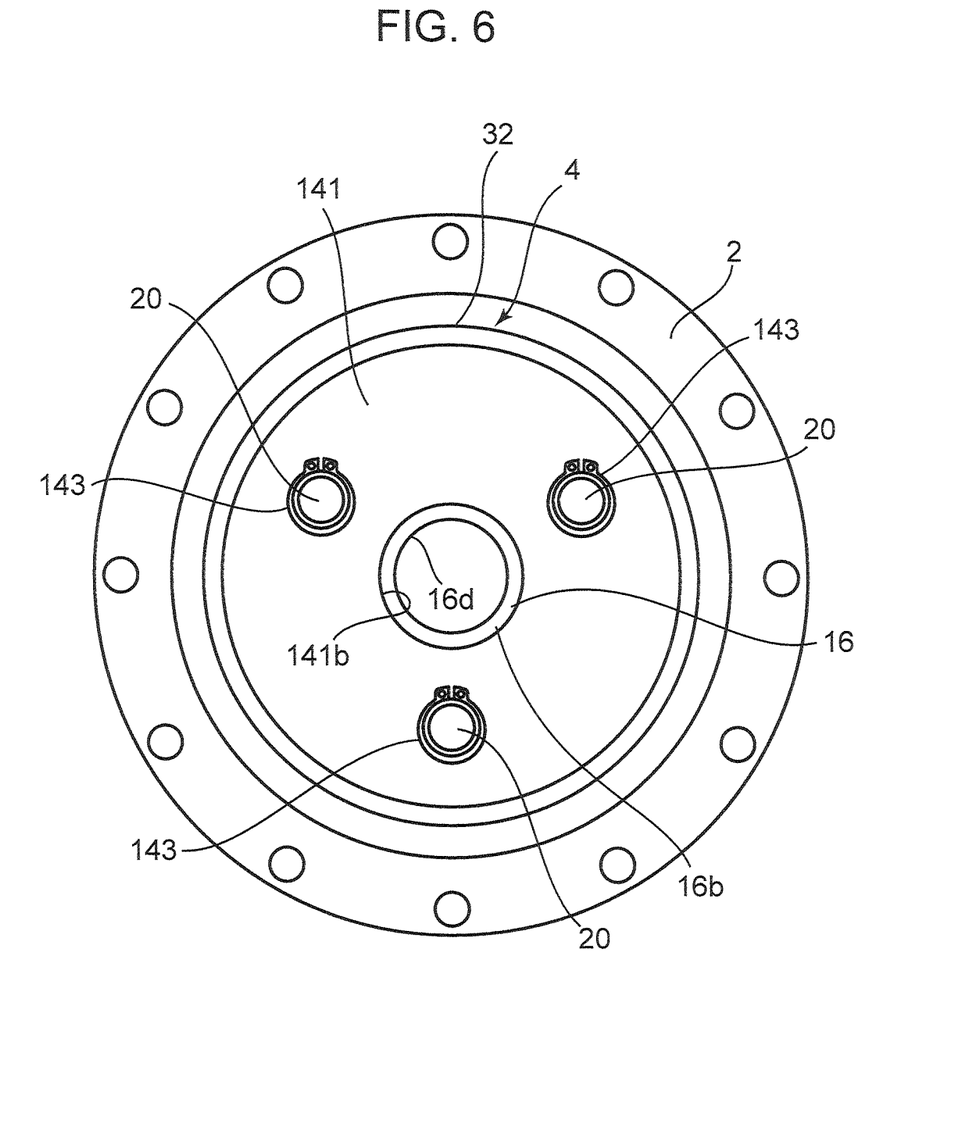
FIG. 6 is a right side view of the gear device shown in FIG. 5.

With the foregoing first embodiment, while the washers 41, 42 are individually mounted on either side of each of the plurality of spur gears 18, the present invention is not limited to the foregoing configuration and, as shown in FIGS. 5 and 6, it is also possible to use large washers 141, 142 to regulate the movement of the input gear 16 in the axial direction.

In other words, the gear device 101 according to the second embodiment shown in FIGS. 5 and 6 comprises washer means comprising a pair of large washers 141, 142. These washers 141, 142 are fixed to be positioned by being separated on either side of the plurality of spur gears 18 in the axial direction, and collectively sandwich the gear part 16a of the input gear and the plurality of spur gears 18 from either side of the spur gear 18 along the axial direction of the spur gear 18.

Specifically, the washers 141, 142 are respectively formed with through-holes 141a, 142a through which the plurality of crank shafts 20 can be inserted. Moreover, formed at the center of the washer 141 is a through-hole 141b into which the connecting part 16b of the input gear 16 is inserted. In this embodiment, a through-hole 142b is also formed at the center of the washer 142. Since the respective internal diameters of the through-hole 141b and the through-hole 142b are smaller than the external diameter of the gear part 16a of the input gear 16, the gear part 16a sandwiched between the washer 141 and the washer 142.

The washers 141, 142 and the spur gear 18 are fixed to the crank shaft 20 in a state of being sandwiched from either side in the axial direction of the crank shaft 20 by the snap rings 143, 144 and regulated so that they will not move in the axial direction.

The external diameter of the washers 141, 142 is either the same as or slightly smaller than the external diameter of the carrier 4.

With regard to the remaining configuration, the gear device 101 according to this embodiment is common with the gear device 1 according to the foregoing first embodiment (refer to FIGS. 1 to 4).

With the configuration of the second embodiment, the pair of large washers 141, 142 are fixed to be positioned by being separated on either side of the plurality of spur gears 18 in the axial direction, and collectively sandwich the gear part 16a of the input gear 16 and the plurality of spur gears 18. Consequently, movement of the input gear 16 in the axial direction can be reliably regulated around the entire periphery of the gear part 16a of the input gear 16 together with the respective engaging portions 145 of the plurality of spur gears 18. Consequently, movement of the input gear 16 in the axial direction can be regulated with a simple configuration, the washers 141, 142 can be easily removed together with the spur gear 18, and the disassembly and assembly are facilitated. In particular, since it is sufficient that a pair of large washers 141, 142 are mounted on either side of the spur gear 18, increase in the work process can be inhibited.

Third Embodiment

Figure 7:
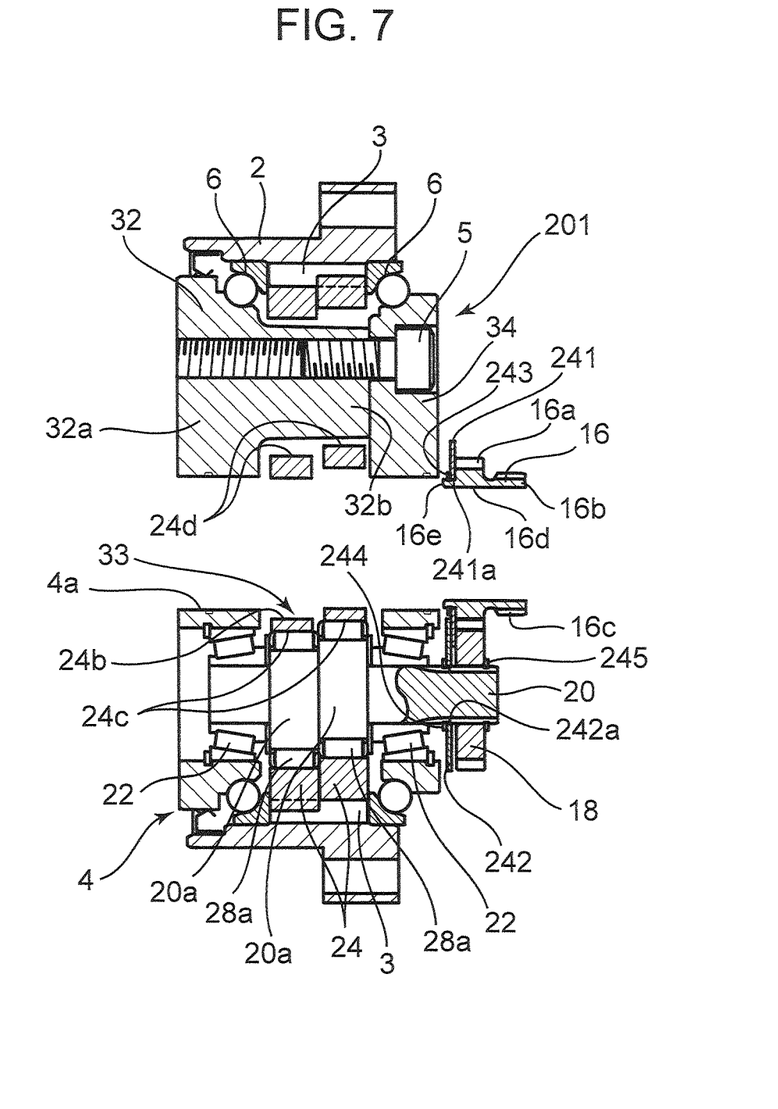
FIG. 7 is a cross section of the gear device according to the third embodiment of the present invention.
Figure 8:
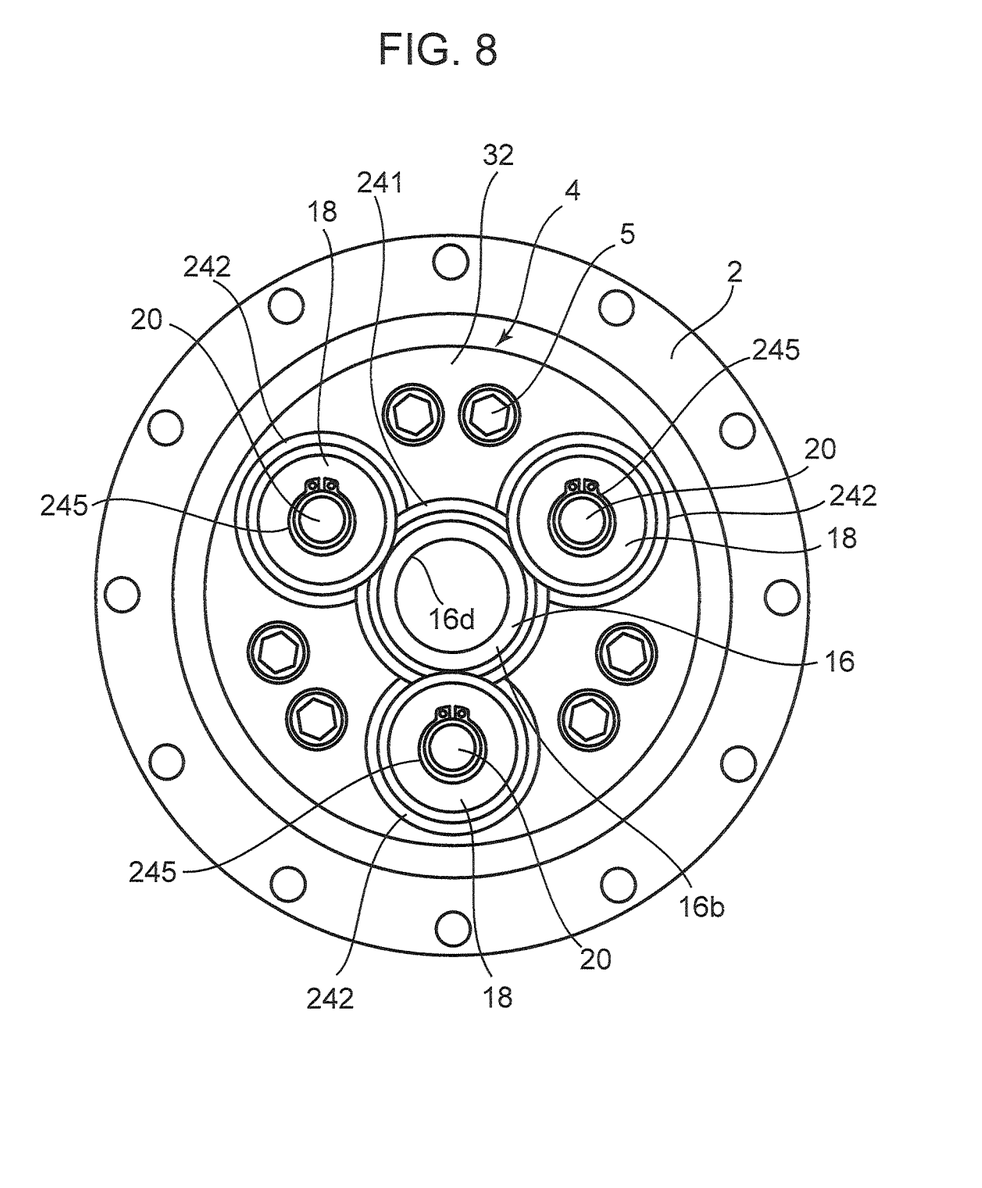
FIG. 8 is a right side view of the gear device shown in FIG. 7.

In the foregoing first and second embodiments, while the washers 41, 42 or the washers 141, 142 were mounted on either side of the plurality of spur gears 18, the present invention is not limited to the foregoing configuration and, as shown in FIGS. 7 and 8, movement of the input gear 16 in the axial direction can also be regulated with a washer 241 that is mounted on the side of the input gear 16 and a washer 242 that is mounted on one side of the spur gear 18.

In other words, the gear device 201 according to the third embodiment shown in FIGS. 7 and 8 comprises a washer means comprising an input gear-side washer 241 that is fixed to the input gear 16, and a spur gear-side washer 242 that is fixed to the crank shaft 20 to be in line with the spur gear 18 along the axial direction of the crank shaft 20.

A through-hole 241a is formed at the center of the input gear-side washer 241. Inserted into the through-hole 241a is a cylindrical protrusion 16e that protrudes to a side that is opposite to the connecting part 16b from the gear part 16a of the input gear 16. Since the external diameter of the washer 241 is larger than the external diameter of the gear part 16a of the input gear 16, the outer peripheral portion of the washer 241 protrudes outward from the outer peripheral face of the gear part 16a of the input gear 16. The washer 241 is mounted by coming into contact with the gear part 16a of the input gear 16 in a state where the protrusion 16e of the input gear 16 is inserted into its through-hole 241a, and regulated so that it does not move in the axial direction via the snap ring 243.

The spur gear-side washer 242 is a thin metal disk including a through-hole 242a, and is fixed to the crank shaft 20 so as to be in line with one side (side near the carrier 4 in this embodiment) of the spur gear 18 along the axial direction of the spur gear 18. Specifically, the spur gear 18 and the washer 242 are mounted on the end of the crank shaft 20 in a state where the outer peripheral portion of the input gear-side washer 241 is sandwiched therebetween, and movement in the axial direction is regulated via the snap rings 244 and 245. The gap between the washer 242 and the spur gear 18 has a space that is wider than the thickness of the washer 241 in order to ensure the rotation of the input gear-side washer 241. The external diameter of the washer 242 is set to be slightly larger than the external diameter of the spur gear 18, and at least to be a size that overlaps with the engaging portion of the spur gear 18 and the input gear 16.

With this gear device 201, the input gear 16 can be regulated so that it will not move in its axial direction by sandwiching the input gear-side washer 241 with the spur gear 18 and the spur gear-side washer 242.

With regard to the remaining configuration, the gear device 201 according to this embodiment is common with the gear device 1 according to the foregoing first embodiment (refer to FIGS. 1 to 4).

With the configuration of the third embodiment, since the movement of the input gear 16 in the axial direction is regulated by sandwiching the input gear-side washer 241, which is fixed to the input gear 16, with the spur gear 18 and the spur gear-side washer 242 that is in line with the spur gear 18, it is possible to regulate the input gear 16 so that it does not move in the axial direction with a simple structure. Moreover, the input gear 16 and the spur gear 18 can be replaced simply by removing the input gear-side washer 241 and the spur gear-side washer 242, and the reduction gear ratio can be changed easily. Moreover, clearance between the spur gear 18 and the spur gear-side washer 242 that is in line with the spur gear 18 is ensured by sandwiching the input gear-side washer 241 fixed to the input gear 16.

Fourth Embodiment

In the foregoing third embodiment, while the movement of the input gear 16 in the axial direction is regulated by sandwiching the input gear-side washer 241 shown in FIGS. 7 and 8 with the spur gear 18 and the spur gear-side washer 242, the present invention is not limited to the foregoing configuration, and the input gear-side washer may also be sandwiched with a pair of washers fixed to the carrier 4.

Figure 9:
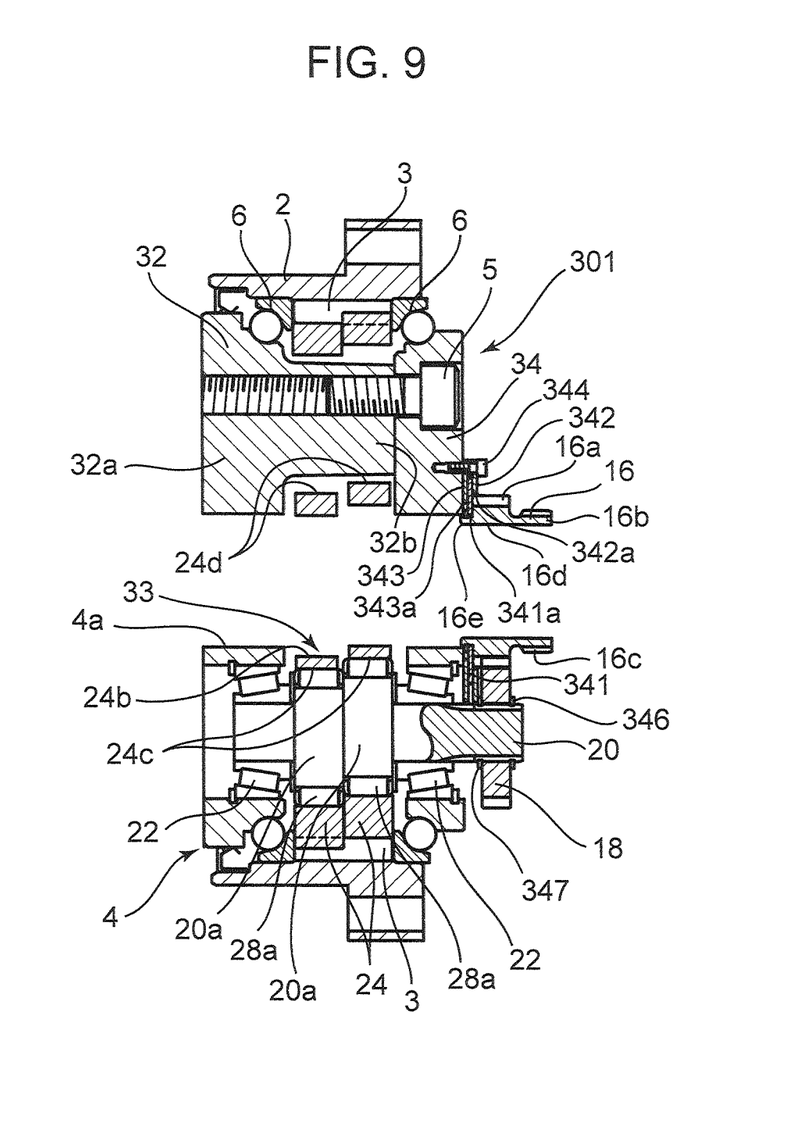
FIG. 9 is a cross section of the gear device according to the fourth embodiment of the present invention.
Figure 10:
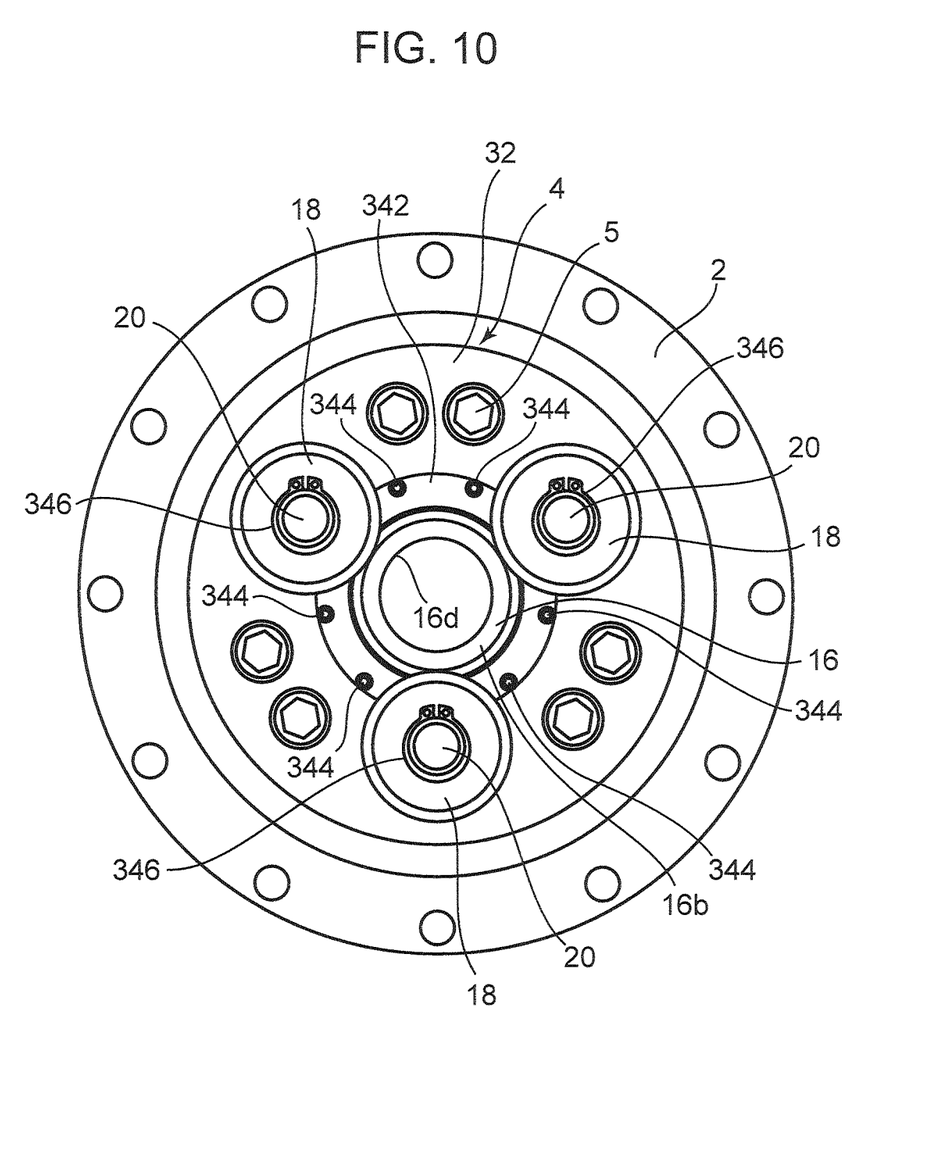
FIG. 10 is a right side view of the gear device shown in FIG. 9.
Figure 11:
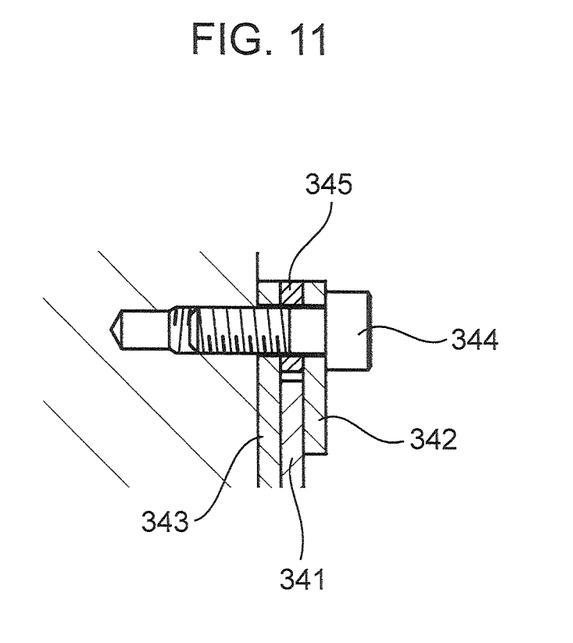
FIG. 11 is an enlarged cross section near the end of the washer shown in FIG. 9.

In other words, the gear device 301 according to the fourth embodiment shown in FIGS. 9 to 11 comprises an input gear-side washer 341 fixed to the input gear 16, and a washer means comprising a pair of carrier-side washers 342, 343. The carrier-side washers 342, 343 are fixed to the carrier 4 on the outside of the carrier 4 along the axial direction, and disposed by being separated from each other along the axial direction of the carrier 4.

A through-hole 341a is formed at the center of the input gear-side washer 341. Inserted into the through-hole 341a is a cylindrical protrusion 16e that protrudes to a side that is opposite to the connecting part 16b from the gear part 16a of the input gear 16. Since the external diameter of the washer 341 is larger than the external diameter of the gear part 16a of the input gear 16, the outer peripheral portion of the washer 341 protrudes outward from the outer peripheral face of the gear part 16a of the input gear 16. The washer 341 is mounted by coming into contact with the gear part 16a of the input gear 16 in a state where the protrusion 16e of the input gear 16 is inserted into its through-hole 341a, and regulated so that it does not move in the axial direction via the snap ring (not shown).

The carrier-side washers 342, 343 are thin metal disks or ring-shaped members including through-holes 342a, 343a. The washers 342, 343 are mounted around the through-hole 4a of the carrier 4 on the surface of the end plate part 34 of the carrier 4 with a screw 344 in a state of sandwiching the ring-shaped collar 345 for securing a gap therebetween. The input gear-side washer 341 is disposed with a slight backlash between the carrier-side pair of washers 342, 343, and movement of the input gear 16 and the washer 341 in the axial direction is thereby regulated.

With this gear device 301, the respective spur gears 18 are fixed to the respective crank shafts 20 with a pair of snap rings 346, 347.

With regard to the remaining configuration, the gear device 301 according to this embodiment is common with the gear device 1 according to the foregoing first embodiment (refer to FIGS. 1 to 4).

With the configuration of the fourth embodiment, since the movement of the input gear 16 in the axial direction is regulated by fixing the input gear-side washer 341 which is fixed to the input gear 16, to the carrier 4, while sandwiching the input gear-side washer 341 with a pair of carrier-side washers 342, 343, it is possible to regulate the input gear 16 so that it does not move in the axial direction with a simple structure. Moreover, the input gear 16 can be replaced simply by removing the input gear-side washer 341 and the pair of carrier-side washers 342, 343, and the reduction gear ratio can be changed easily. In particular, since the pair of carrier-side washers 342, 343 is fixed to the carrier 4, the clearance therebetween can be adjusted easily, the mounting margin of the input gear 16 can be accurately adjusted. The adjustment of the clearance can be easily performed through replacement with a collar 345 of a different thickness.

Note that the foregoing first to fourth embodiments cover the concept of the following invention.

The foregoing gear device is a gear device for transmitting torque, at a predetermined reduction gear ratio, between a pair of partner members, comprising: an outer cylinder which can be fixed to one of the pair of partner members; a plurality of crank shafts; a carrier which can be fixed to the other one of the pair of partner members and rotatably housed inside the outer cylinder, and rotatably supports the plurality of crank shafts, and moreover rotates relative to the outer cylinder in synchronization with the rotation of the plurality of crank shafts; a plurality of spur gears which are fixed coaxially with the crank shafts at portions extending toward an outer side of the carrier in the crank shafts; an input gear which includes a gear part that engages with the plurality of spur gears, and transmits rotational drive force to each of the plurality of spur gears; and washer means comprising a plurality of washers disposed outside the carrier, wherein the input gear is regulated from moving in a radial direction of the input gear by engaging with the plurality of spur gears at a position outside the carrier in an axial direction, and regulated from moving in an axial direction of the input gear by the washer means.

According to the foregoing configuration, since the input gear is regulated from moving in the radial direction as a result of engaging with the plurality of spur gears at a position that is outside of the carrier, in the axial direction, of the gear device, and regulated from moving in the axial direction by the washer means comprising the washers disposed outside the carrier, it is possible to regulate the input gear from moving in the axial direction with a simple structure. Moreover, by removing the respective washers disposed outside the carrier, the input gear can be easily replaced by releasing the regulation of the input gear in the axial direction, and the reduction gear ratio can be changed easily.

Moreover, preferably, each of the plurality of washers is disposed separately on either side of the spur gear in the axial direction of the spur gear.

According to the foregoing configuration, since the washers are disposed by being separated on either side of the spur gear in the axial direction, it is possible to sandwich the input gear with the washers, and regulate the movement of the input gear in the axial direction. Consequently, it is possible to regulate the movement of the input gear in the axial direction with a simple configuration. Furthermore, the washers can be easily removed together with the spur gear, and the disassembly and assembly are facilitated. Moreover, the washers can be commonly utilized even with gear devices having a carrier of different sizes.

Moreover, preferably, each of the plurality of washers is provided individually to each of the plurality of spur gears, and sandwiches the gear part of the input gear from either side in the axial direction of the spur gear.

According to the foregoing configuration, the respective washers are provided independently to each of the plurality of spur gears, and the movement of the input gear in the axial direction can be reliably regulated by the respective washers sandwiching the gear part of the input gear from either side of the spur gear. It is thereby possible to regulate the movement of the input gear in the axial direction with a simple configuration. Furthermore, the washers can be easily removed together with the spur gear, and the disassembly and assembly are facilitated. In particular, since the respective washers can be attached to and detached from the crank shaft together with the spur gear, the disassembly and assembly work is facilitated, and increase in the work process can be inhibited.

Moreover, preferably, each of the plurality of washers is fixed so as to be position separately on either side in the axial direction of the plurality of spur gears, and each of the plurality of washers collectively sandwiches the gear part of the input gear and the plurality of spur gears.

According to the foregoing configuration, since the respective washers are fixed to be positioned by being separated on either side of the plurality of spur gears in the axial direction, and collectively sandwich the gear part of the input gear and the plurality of spur gears, movement of the input gear in the axial direction can be reliably regulated. It is thereby possible to regulate the movement of the input gear in the axial direction with a simple configuration, the washers can be easily removed together with the spur gear, and the disassembly and assembly are facilitated. In particular, with each of a pair of large washers being attached on either side of the spur gear is attached, an increase in the work process can be inhibited.

Moreover, preferably, the washer means comprises an input gear-side washer which is fixed to the input gear, and a spur gear-side washer which is fixed to the crank shaft so as to be in line with the spur gear along the axial direction of the crank shaft, and the input gear is regulated from moving in the axial direction as a result of the input gear-side washer being sandwiched by the spur gear and the spur gear-side washer.

According to the foregoing configuration, since the input gear is regulated from moving in its axial direction as a result of the input gear-side washer, which is fixed to the input gear, being sandwiched by the spur gear and the spur gear-side washer which is in line with the spur gear, movement of the input gear in the axial direction can be regulated with a simple structure. Moreover, the input gear and the spur gear can be replaced simply by removing the input gear-side washer and the spur gear-side washer, and the reduction gear ratio can be changed easily.

Moreover, preferably, the washer means comprises an input gear-side washer which is fixed to the input gear, and a pair of carrier-side washers which are fixed to the carrier on an outer side of the carrier along the axial direction, and disposed by being mutually separated along the axial direction of the carrier, and the input gear is regulated from moving in the axial direction as a result of the input gear-side washer being sandwiched by the pair of carrier-side washers.

According to the foregoing configuration, since the movement of the input gear in the axial direction is regulated by fixing the carrier while sandwiching the input gear-side washer, which is fixed to the input gear, with a pair of carrier-side washers, it is possible to regulate the input gear so that it does not move in the axial direction with a simple structure. Moreover, the input gear can be replaced simply by removing the input gear-side washer and the pair of carrier-side washers, and the reduction gear ratio can be changed easily. In particular, since the pair of carrier-side washers is fixed to the carrier, the clearance therebetween can be adjusted easily, the mounting margin of the input gear can be accurately adjusted.

Moreover, preferably, the input gear further comprises a connecting part which is disposed concentrically in line with the gear part, and includes a spline groove extending along the axial direction of the input gear, and the spline groove is formed in a shape capable of engaging with a shaft that transmits the rotational drive force of a motor while being regulated from moving in the radial direction of the input gear.

According to the foregoing configuration, since the spline groove of the connecting part disposed concentrically in in line with the gear part of the input gear can be fitted into the shaft, which transmits the rotational drive force of the motor, while being regulated so that it does not move in the axial direction of the input gear, drive from the motor can be easily transmitted to the gear device, and the input gear can be easily mounted on the shaft.

Note that the present invention is not limited to the first to fourth embodiments, and may be variously modified or improved to the extent that it does not deviate from the gist of this invention. For example, in the fourth embodiment, while the input gear-side washer 341 fixed to the input gear 16 is fixed to the carrier 4 while being sandwiched with the pair of carrier-side washers 342, 343, the input gear-side washer 341 may also be fixed to the carrier 4 by being sandwiched with the carrier-side washer 342 and the end face of the carrier 4 (end plate part 34).

Moreover, the configuration may also be such that the carrier 4 is fastened to the base 52, and the outer cylinder 2 is fixed to the revolving superstructure 50. Moreover, the configuration may also be such that the drive shafts DS1 to DS3 do not penetrate the carrier 4.

The invention claimed is:

1. A gear device for transmitting torque, at a predetermined reduction gear ratio, between first and second partner members, comprising:
    an outer cylinder configured to be fixed to the first partner member;
    a plurality of crank shafts;
    a carrier configured to be fixed to the second partner member, the carrier rotatably supporting the plurality of crank shafts, and rotating about a rotational axis relative to the outer cylinder and in synchronization with rotation of the plurality of crank shafts;
    a plurality of spur gears disposed so that each of the spur gears is fixed coaxially with a corresponding one of the crank shafts at a portion of the corresponding crank shaft that extends outward from the carrier in a direction of the rotational axis of the carrier;
    an input gear with a toothed part that engages with the plurality of spur gears axially outside of the carrier to keep the input gear from moving in radial directions of the input gear and transmits rotational drive force to each of the plurality of spur gears; and
    a washer mechanism disposed outside the carrier, the washer mechanism including:
    at least two washer parts disposed respectively on axially opposite surfaces of each of the plurality of spur gears; and
    the toothed part of the input gear being positioned between the at least two washer parts to keep the input gear from moving in the axial direction of the input gear.

2. The gear device according to claim 1, wherein
    the at least two washer parts for one of the plurality of spur gears are separate from the at least two washer parts for another one of the plurality of spur gears.

3. The gear device according to claim 1, wherein
    the at least two washer parts for one of the plurality of spur gears are continuous with the at least two washer parts for another one of the plurality of spur gears.

4. The gear device according to claim 1, wherein
    the input gear further comprises a connecting part that is disposed concentrically in line with the toothed part, and includes a spline groove extending along the axial direction of the input gear, and the spline groove is formed in a shape capable of engaging with a shaft that transmits a rotational drive force of a motor while being regulated from moving in the radial direction of the input gear.

5. A gear device for transmitting torque at a predetermined reduction gear ratio between first and second partner members, comprising:
- an outer cylinder configured to be fixed to the first partner member;
- a plurality of crank shafts;
- a carrier configured to be fixed to the second partner member, the carrier being housed rotatably inside the outer cylinder and rotatably supporting the plurality of crank shafts so that the carrier rotates about a rotational axis relative to the outer cylinder and in synchronization with rotation of the plurality of crank shafts;
- a plurality of spur gears disposed so that each of the spur gears is fixed coaxially with a corresponding one of the crank shafts at a portion of the corresponding crank shaft that extends out from the carrier in a direction of the rotational axis of the carrier;
- an input gear with a toothed part that engages with each of the plurality of spur gears axially outside of the carrier to keep the input gear from moving in radial directions of the input gear and transmits rotational drive force to each of the plurality of spur gears;
- a washer mechanism being disposed outside the carrier, the washer mechanism including:
- an input gear-side washer that is fixed to the input gear; and
- a spur gear-side washer that is fixed to each of the plurality of crank shafts and is in line with the corresponding spur gear along an axial direction of the crank shaft,
- the input gear-side washer being sandwiched by the spur gear and the spur gear-side washer to keep the input gear from moving in the axial direction of the input gear.

6. A gear device for transmitting torque at a predetermined reduction gear ratio between a pair of partner members, comprising:
- an outer cylinder configured to be fixed to the first partner member;
- a plurality of crank shafts;
- a carrier configured to be fixed to the second partner member, the carrier being housed rotatably inside the outer cylinder and rotatably supporting the plurality of crank shafts so that the carrier rotates about a rotational axis relative to the outer cylinder and in synchronization with rotation of the plurality of crank shafts;
- a plurality of spur gears disposed so that each of the spur gears is fixed coaxially with a corresponding one of the crank shafts at a portion of the corresponding crank shaft that extends out from the carrier in a direction of the rotational axis of the carrier;
- an input gear with a toothed part that engages with each of the plurality of spur gears axially outside of the carrier to keep the input gear from moving in radial directions of the input gear and transmits rotational drive force to each of the plurality of spur gears;
- a washer mechanism disposed outside the carrier, the washer mechanism including:
- an input gear-side washer that is fixed to the input gear; and
- a pair of carrier-side washers that are fixed to the carrier on an outer side of the carrier along the axial direction of the carrier, and spaced from each other along the axial direction of the carrier,
- the input gear-side washer being sandwiched by the pair of carrier-side washers to keep the input gear from moving in the axial direction of the input gear.

* * * * *